(12) United States Patent  
Le et al.

(10) Patent No.: US 12,400,680 B1  
(45) Date of Patent: Aug. 26, 2025

(54) HEAD AND MEDIA OVERCOATS FOR HEAT ASSISTED MAGNETIC RECORDING

(71) Applicant: Western Digital Technologies, Inc., San Jose, CA (US)

(72) Inventors: Quang Le, San Jose, CA (US); Tan Duy Trinh, San Jose, CA (US); Hassan Osman, San Jose, CA (US); Maki Maeda, Fujisawa (JP); Qing Dai, San Jose, CA (US); Hisashi Takano, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/652,371

(22) Filed: May 1, 2024

(51) Int. Cl.
*G11B 20/10* (2006.01)
*G11B 5/31* (2006.01)
*G11B 5/72* (2006.01)
*G11B 5/84* (2006.01)
*G11B 13/08* (2006.01)
*G11B 5/00* (2006.01)

(52) U.S. Cl.
CPC ............. *G11B 5/7264* (2020.08); *G11B 5/84* (2013.01); *G11B 13/08* (2013.01); *G11B 2005/0021* (2013.01)

(58) Field of Classification Search
CPC .......... G11B 5/738; G11B 5/40; G11B 5/645; G11B 5/653; G11B 5/732; G11B 2005/0021; G11B 5/41; G11B 5/3106; G11B 5/62; G11B 5/65; G11B 5/855; G11B 11/10584; G11B 11/10586; G11B 7/716; G11B 5/714; G11B 5/4826; G11B 5/4866

USPC ........................................................ 360/59
See application file for complete search history.

(56) References Cited

U.S. PATENT DOCUMENTS

| | | |
|---|---|---|
| 5,942,317 A | 8/1999 | White |
| 6,537,686 B1 | 3/2003 | Chen |
| 6,565,719 B1 | 5/2003 | Lairson et al. |
| 6,576,328 B2 | 6/2003 | Deng et al. |
| 6,583,953 B1 | 6/2003 | Han et al. |
| 7,286,326 B2 | 10/2007 | Yasui et al. |
| 7,782,569 B2 | 8/2010 | Cheng et al. |
| 8,014,104 B2 | 9/2011 | Cheng et al. |
| 8,472,134 B2 | 6/2013 | Kodama et al. |
| 8,559,136 B1 | 10/2013 | Matsumura et al. |
| 8,638,645 B1 | 1/2014 | Nishijima et al. |
| 8,687,323 B2 | 4/2014 | Marchon et al. |
| 8,721,903 B2 | 5/2014 | Bian et al. |

(Continued)

*Primary Examiner* — Nabil Z Hindi
(74) *Attorney, Agent, or Firm* — PATTERSON + SHERIDAN, LLP (57) ABSTRACT

The present disclosure generally relates to a magnetic recording drive comprising a write head disposed over a media. The write head comprises a main pole, a waveguide disposed adjacent to the main pole, a near field transducer (NFT) coupled between the main pole and the waveguide at a media facing surface (MFS) and a head overcoat disposed on the MFS, the head overcoat comprising SiN. The head overcoat has an extinction coefficient (k) value of about 0.0. The media comprises a media overcoat disposed adjacent to the head overcoat. The media overcoat comprises a first layer of C and a second layer of SiN disposed on the first layer. The media overcoat has a k-value of about 0.5 or greater. The head overcoat is transparent while the media overcoat is heat absorbent.

19 Claims, 6 Drawing Sheets

(56) References Cited

U.S. PATENT DOCUMENTS

| | | | |
|---|---|---|---|
| 8,902,720 B1 | 12/2014 | Schreck et al. | |
| 9,036,307 B1 | 5/2015 | Hoshiya et al. | |
| 9,460,738 B1 | 10/2016 | Torres et al. | |
| 9,530,445 B1 * | 12/2016 | Grobis | G11B 5/658 |
| 9,940,953 B1 | 4/2018 | Zavaliche et al. | |
| 10,121,506 B1 | 11/2018 | Xu et al. | |
| 10,643,648 B2 | 5/2020 | Zhang et al. | |
| 10,796,719 B1 | 10/2020 | Jubert et al. | |
| 11,074,929 B1 * | 7/2021 | Herber | G11B 5/255 |
| 11,127,421 B1 | 9/2021 | Siangchaew et al. | |
| 11,348,603 B2 | 5/2022 | Bergerud et al. | |
| 12,159,654 B1 | 12/2024 | Habibollahzadeh et al. | |
| 2006/0286292 A1 | 12/2006 | Jiang et al. | |
| 2008/0187781 A1 | 8/2008 | Cheng et al. | |
| 2011/0032640 A1 | 2/2011 | Marchon et al. | |
| 2013/0114165 A1 * | 5/2013 | Mosendz | G11B 5/7264 360/244 |
| 2021/0118469 A1 | 4/2021 | Khamnualthong et al. | |
| 2023/0238023 A1 | 7/2023 | Trinh et al. | |

\* cited by examiner

HEAD AND MEDIA OVERCOATS FOR HEAT ASSISTED MAGNETIC RECORDING

BACKGROUND OF THE DISCLOSURE

Field of the Disclosure

Embodiments of the present disclosure generally relate to a magnetic media drive comprising a magnetic recording head and a media.

Description of the Related Art

The heart of the functioning and capability of a computer is the storing and writing of data to a data storage device, such as a magnetic media drive (e.g., hard disk drive (HDD)). The volume of data processed by a computer is increasing rapidly. There is a need for higher recording density of a magnetic recording medium to increase the function and the capability of a computer.

In order to achieve higher recording densities, such as recording densities exceeding 2 Tbit/in$^2$ for a magnetic recording medium, the width and pitch of write tracks are narrowed, and thus the corresponding magnetically recorded bits encoded in each write track is narrowed. One challenge in narrowing the width and pitch of write tracks is decreasing a surface area of a main pole of the magnetic recording write head at a media facing surface (MFS). As the main pole becomes smaller, the recording field becomes smaller as well, limiting the effectiveness of the magnetic recording write head.

Heat-assisted magnetic recording (HAMR) and microwave assisted magnetic recording (MAMR) are two types of energy-assisted magnetic recording (EAMR) technology to improve the recording density of a magnetic recording medium. In HAMR, a laser source is located next to or near the write element of the magnetic recording write head in order to produce heat, such as a laser source exciting a near-field transducer (NFT) to produce heat at a write location of a magnetic recording medium. Gold is typically used for the NFT material to achieve a high optical efficiency, but the melting point of gold is low and deformation of the NFT is a problem when the NFT is heated for a long term. The NFT temperature is especially high near the point where the optical near-field is generated, and the maximum temperature may reach more than 150 degrees Celsius over the operational temperature of the magnetic disk device, causing the NFT to deform.

Therefore, there is a need in the art for an improved HAMR magnetic media drive.

SUMMARY OF THE DISCLOSURE

The present disclosure generally relates to a magnetic recording drive comprising a write head disposed over a media. The write head comprises a main pole, a waveguide disposed adjacent to the main pole, a near field transducer (NFT) coupled between the main pole and the waveguide at a media facing surface (MFS) and a head overcoat disposed on the MFS, the head overcoat comprising SiN. The head overcoat has an extinction coefficient (k) value of about 0.0. The media comprises a media overcoat disposed adjacent to the head overcoat. The media overcoat comprises a first layer of C and a second layer of SiN disposed on the first layer. The media overcoat has a k-value of about 0.5 or greater. The head overcoat is transparent while the media overcoat is heat absorbent.

In one embodiment, a magnetic recording drive comprises a write head, the write head comprising a head overcoat disposed on a media facing surface (MFS), the head overcoat comprising SiN, and a media disposed adjacent to the MFS of the write head, the media comprising a media overcoat comprising a first layer of SiN disposed over a second layer of C.

In another embodiment, a magnetic recording drive comprises a write head, the write head comprising: a main pole, a waveguide disposed adjacent to the main pole, a near field transducer (NFT) coupled between the main pole and the waveguide at a media facing surface (MFS), and a head overcoat disposed on the MFS, the head overcoat comprising SiN, and a head overcoat disposed on the MFS adjacent to the NFT, the head overcoat comprising SiN and having an extinction coefficient (k) value of about 0.0, and a media disposed adjacent to the MFS of the write head, the media comprising a media overcoat comprising a bilayer of SiN and C, with the C layer having a k-value of 0.5 or greater.

In yet another embodiment, a magnetic recording drive comprises a write head, the write head comprising: a main pole, a waveguide disposed adjacent to the main pole, a near field transducer (NFT) coupled between the main pole and the waveguide at a media facing surface (MFS), and a transparent head overcoat disposed on the MFS adjacent to the NFT, the head overcoat comprising SiN and having a heat extinction coefficient (k) value of less than about 0.1, and a media disposed adjacent to the MFS of the write head, the media comprising an absorbent media overcoat comprising a first layer of C and a second layer SiN, the first layer of C having a k-value of 0.5 or greater.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording drive comprising a write head disposed over a media. The write head comprises a main pole, a waveguide disposed adjacent to the main pole, a near field transducer (NFT) coupled between the main pole and the waveguide at a media facing surface (MFS) and a head overcoat disposed on the MFS, the head overcoat comprising SiN. The head overcoat has an extinction coefficient (k) value of about 0.0. The media comprises a media overcoat disposed adjacent to the head overcoat. The media overcoat comprises a first layer of C and a second layer of SiN disposed on the first layer. The media overcoat has a k-value of about 0.5 or greater. The head overcoat is transparent while the media overcoat is heat absorbent.

Figure 1:
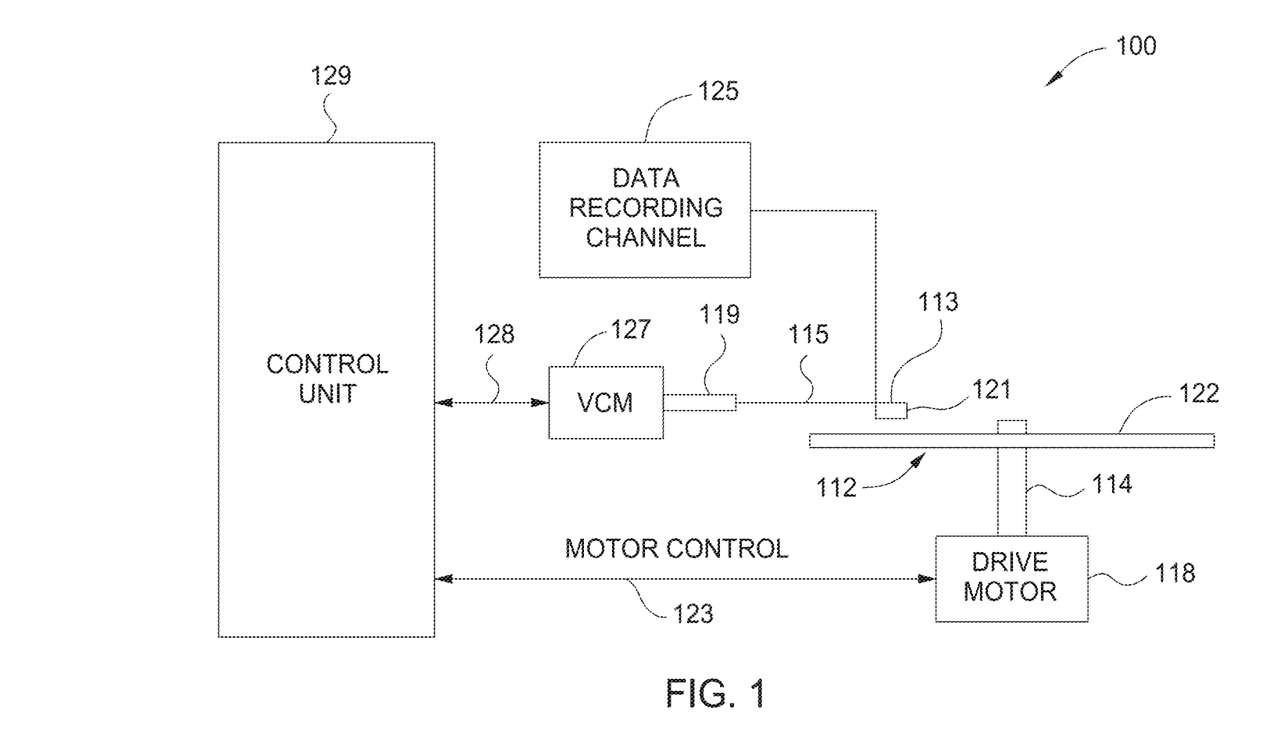
FIG. 1 is a schematic illustration of certain embodiments of a magnetic media drive including a HAMR magnetic write head.

FIG. 1 is a schematic illustration of certain embodiments of a magnetic media drive 100 including an energy-assisted magnetic recording (EAMR) write head, such as a heat-assisted magnetic recording (HAMR) or microwave assisted magnetic recording (MAMR) write head. Such magnetic media drive may be a single drive/device or comprise multiple drives/devices. For the ease of illustration, a single disk drive 100 is shown according to one embodiment. The disk drive 100 includes at least one rotatable magnetic recording medium 112 (oftentimes referred to as magnetic disk 112) supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112. Each slider 113 supports a head assembly 121 including one or more read heads and one or more write heads such as a HAMR write head. As the magnetic disk 112 rotates, the slider 113 moves radially in and out over the disk surface 122 so that the head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on magnetic disk 112. Write and read signals are communicated to and from the head assembly 121 by way of recording channel 125. Certain embodiments of a magnetic media drive of FIG. 1 may further include a plurality of media, or disks, a plurality of actuators, and/or a plurality number of sliders.

Figure 2:
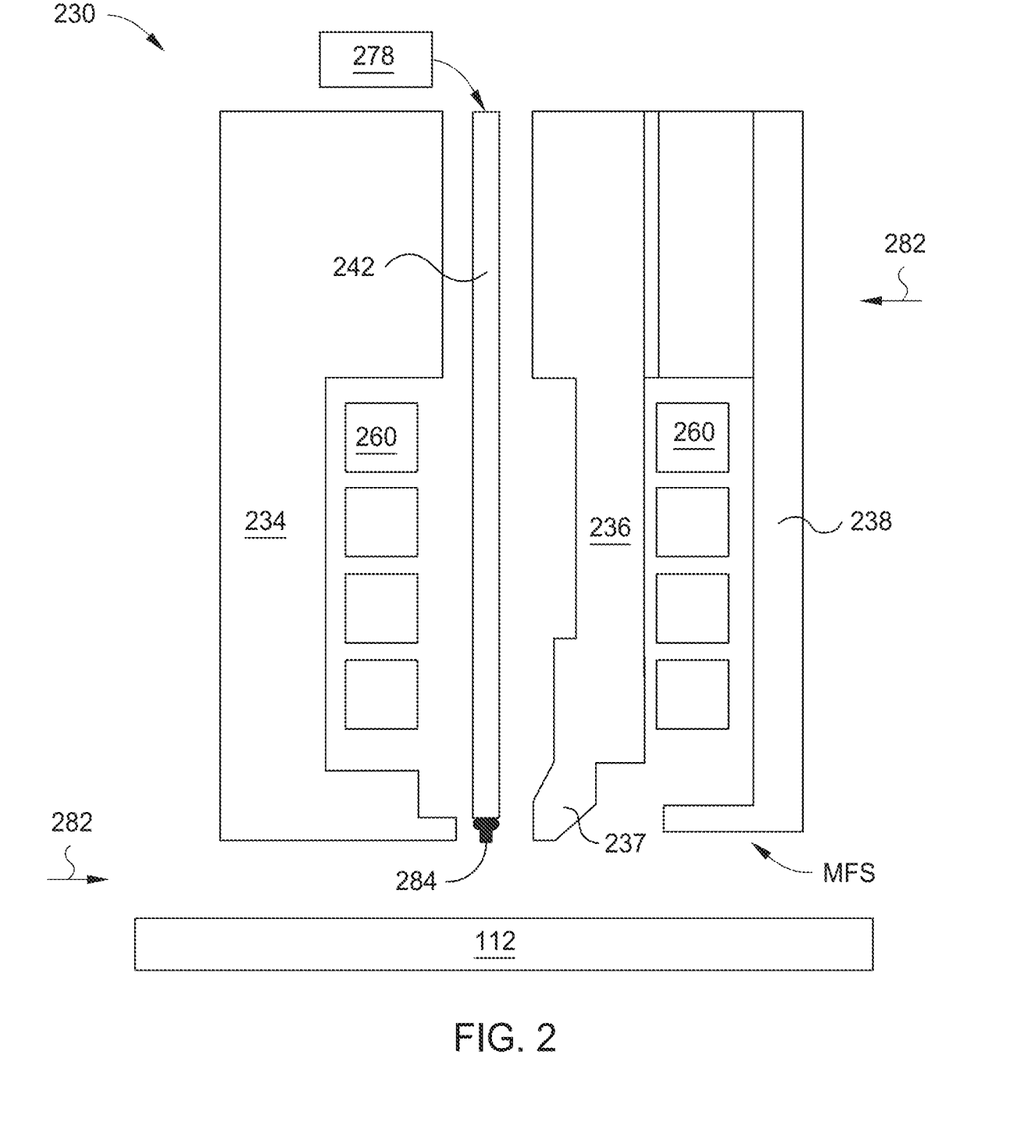
FIG. 2 is a schematic illustration of certain embodiments of a cross sectional side view of a HAMR write head facing a magnetic disk.

FIG. 2 is a schematic illustration of certain embodiments of a cross sectional side view of a HAMR write head 230 facing a magnetic disk 112. The HAMR write head 230 may correspond to part of the reading/recording head assembly 121 described in FIG. 1 or a recording head used in other magnetic media drives. The HAMR write head 230 includes a media facing surface (MFS), such as an air bearing surface (ABS) or a gas bearing surface (GBS), facing the disk 112. As shown in FIG. 2, the magnetic disk 112 and the HAMR write head 230 relatively moves in the direction indicated by the arrows 282 (need to change direction).

The HAMR write head 230 includes a main pole 236 disposed between a leading return shield 234 and a trailing return shield 238. The main pole 236 can include a main pole tip 237 at the MFS. The main pole tip 237 can include or not include a leading taper and/or a trailing taper. A coil 260 around the main pole 236 excites the main pole tip 237 to produce a writing magnetic field for affecting a magnetic medium of the rotatable magnetic disk 112. The coil 260 may be a helical structure or one or more sets of pancake structures. The leading return shield 234 and/or the trailing return shield 238 can act as the return pole for the main pole 236.

The magnetic disk 112 is positioned adjacent to or under the HAMR write head 230. A magnetic field produced by current in the coil 260 is used to control the direction of magnetization of bits in the magnetic disk 112.

The HAMR write head 230 includes a structure for heating the magnetic disk 112 proximate to where the main pole tip 237 applies the magnetic write field to the storage media. A waveguide 242 is positioned between the main pole 236 and the leading return shield 234. The waveguide 242 can includes a core layer and a cladding layer surrounding the core layer. The waveguide 242 conducts light from a light source 278 of electromagnetic radiation, which may be, for example, ultraviolet, infrared, or visible light. The light source 278 may be, for example, an edge emitting laser diode (EELD) or a vertical cavity surface emitting laser (VCSEL) device, a laser diode, or other suitable laser light source for directing a light beam toward the waveguide 242.

Various techniques that are known for coupling the light source 278 into the waveguide 242 may be used. For example, the light source 278 may work in combination with an optical fiber and external optics for directing a light beam to the waveguide 242. Alternatively, the light source 278 may be mounted on the waveguide 242 and the light beam may be directly coupled into the waveguide 242 without the need for external optical configurations. Once the light beam is coupled into the waveguide 242, the light propagates through the waveguide and heats a portion of the media, as the media moves relative to the HAMR write head 230 as shown by arrows 282.

The HAMR write head 230 can include a near-field transducer (NFT) 284 to concentrate the heat in the vicinity of the end of the waveguide 242. The NFT 284 is positioned in or adjacent to the waveguide 242 near or at the MFS. Light from the waveguide 242 is absorbed by the NFT 284 and excites surface plasmons which travel along the outside of the NFT 284 towards the MFS concentrating electric charge at the tip of the NFT 284 which in turn capacitively couples to the magnetic disk and heats a precise area of the magnetic disk 112 by Joule heating. One possible NFT 284 for the HAMR write head is a lollipop design with a disk portion and a peg extending between the disk and the MFS. The NFT 284 can be placed in close proximity to the main pole 236. The NFT 284 is relatively thermally isolated and absorbs a significant portion of the laser power while it is in resonance.

The waveguide 242, may be a spot size converter (SSC) that includes numerous waveguides and a multimodal interference (MMI) device. The present disclosure generally relates to the management and enhancement of the profile of the SSC. The SSC discussed herein results in significant improvement in the overall coupling efficiency between a coherent light source and the waveguide inside a photonic integrated circuit (PIC) or planar waveguide circuit (PLC) of a HAMR head slider. The geometry and position of the core materials/assist core channels both on the lateral and vertical vicinity of a center waveguide core are discussed herein. The overall field profile of the SSC can be tuned to match the field profile or the mode of a coherent light source, leading to significant enhancement in the overall coupling efficiency. The waveguide 242 or SSC may comprise a material selected from the group consisting of: $Ta_2O_5$, $Nb_2O_3$, $TiO_2$, $Y_2O_3$, SiN, SiC, and AlN, where the refracting index of core must be lower than that of cladding.

Optical power from an external coherent light source (i.e., EELD, surface emitting diode laser, VCSEL device, or fiber coupled diode laser) is coupled into the PLC of the HAMR head slider through the SSC or mode converter. The basic design concept is to match the mode profile of the incoming light source and the mode profile of the PLC, both at the coupling interface, hence maximizing the overall coupling efficiency.

Figure 3:
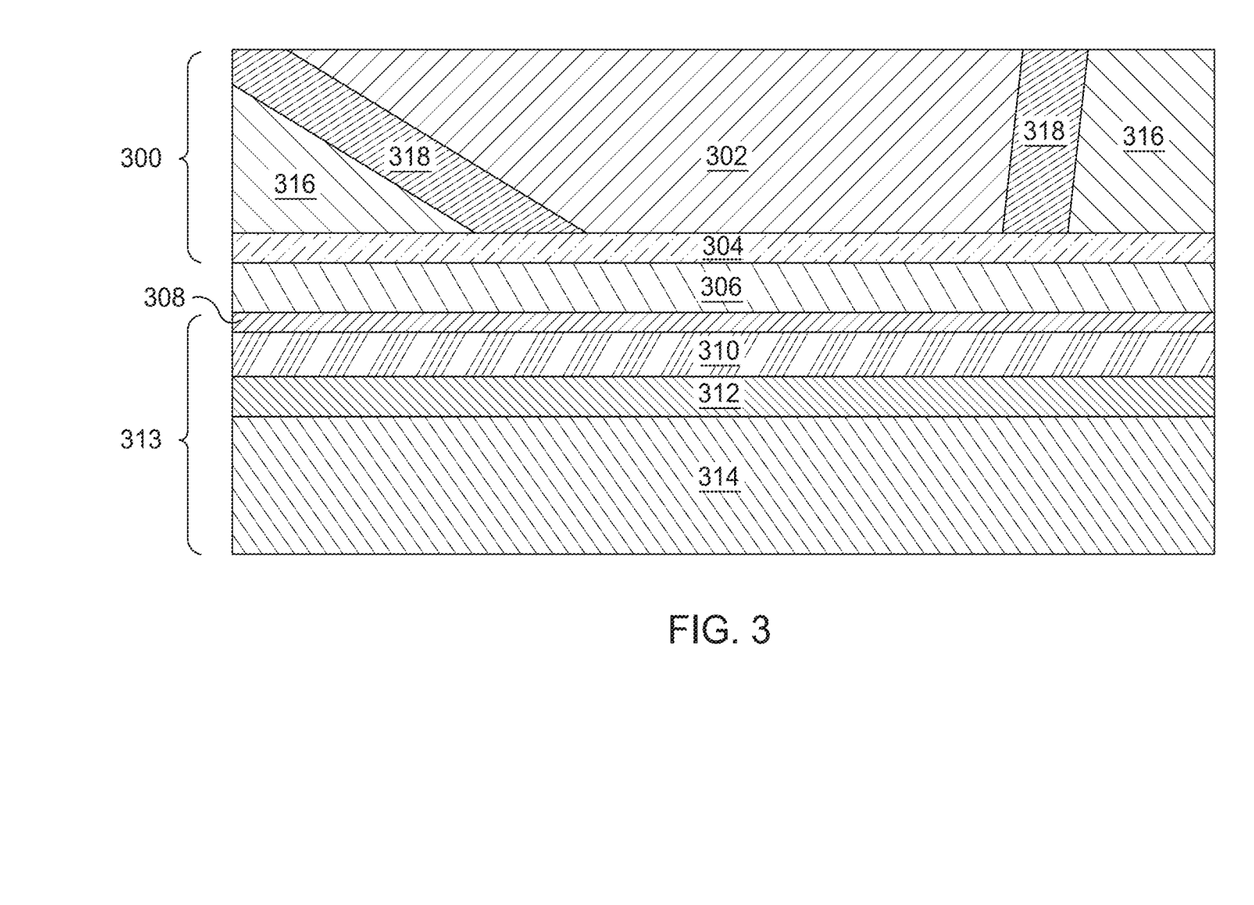
FIG. 3 illustrates a cross-sectional MFS view of a HAMR write head disposed over a media, according to one embodiment.

FIG. 3 illustrates a cross-sectional MFS view of a HAMR write head 300 disposed over a media 313, according to one embodiment. The HAMR write head 300 may be a part of the magnetic media drive 100 of FIG. 1. The HAMR write head may be the HAMR write head 230 of FIG. 2.

The HAMR write head 300 comprises a NFT 302. Adhesion layers 318 are disposed adjacent to the NFT 302, and cladding material 316 is disposed adjacent to the adhesion layers 318. A head overcoat (HOC) 304 covers the MFS of the HAMR write head 300. The media 313 comprises a magnetic recording layer 314, a capping layer 312 disposed on the magnetic recording layer 314, a media overcoat (MOC) 310 disposed on the capping layer 312, and a lubricant 308 disposed on MOC 310. The capping layer 312 may comprise a magnetic material or a magnetic stack of materials, such as Co, Ni, Fe, Pt, and combinations thereof, have a high extinction coefficients (k) value, such as about 0.5 or greater, and a thickness of about 1 nm to about 5 nm. The lubricant may comprise a backbone structure and functional groups that bonds to the carbon overcoat on the media 313 and have a thickness of about 0.5 nm to about 5 nm.

During operation, a smear 306 may be formed from contamination and/or mixing of the lubricant 308, the MOC 310, and the HOC 304, which may then be transferred to the surface of the HAMR write head 300 via evaporation/condensation due to a temperature difference between the head and media surfaces. The smear 306 may be formed due to the HOC 304 and the MOC 310 having non-optimal k-value. For example, the MOC 310 typically has a k-value of about 0.058, and the HOC 304 typically has a k-value of about 0.2, causing the HOC 304 to be non-transparent and the MOC 310 to be non-absorbing. The non-optimal k-values further result in the smear 306 having a k-value of about 0.075, indicating significant optical power loss. The smear 306 may cause the head flying height to increase, causing reliability issues in the head 300. If the smear 306 in the vicinity of the NFT 302 is not removed, it can lead to temperature rising in the vicinity of the NFT 302 and failure of the NFT 302 eventually. Note that in practice there may be a clearance between the head 300 and media 313 in the space occupied by smear 306 in this figure, but it is not shown here for simplicity of illustrative purposes.

However, properties of the MOC 310 and the HOC 304 can be selected to eliminate the negative aspects of the smear 306. As described herein, a MOC 310 comprising a bilayer of carbon having a high k-value and SiN having a low k-value, and a HOC 304 comprising SiN having a low k-value, results in the HOC 304 being transparent and the MOC 310 being heat absorbing, eliminates negative impacts from the smear 306, as the smear 306 will be transparent. The transparent HOC 304 and the absorbing MOC 310 increases the absorption in the media 313 and reduces the laser power in the head 300, reducing the temperature difference between the head and media surfaces, thus improving the reliability of the NFT 302.

Figure 4A:
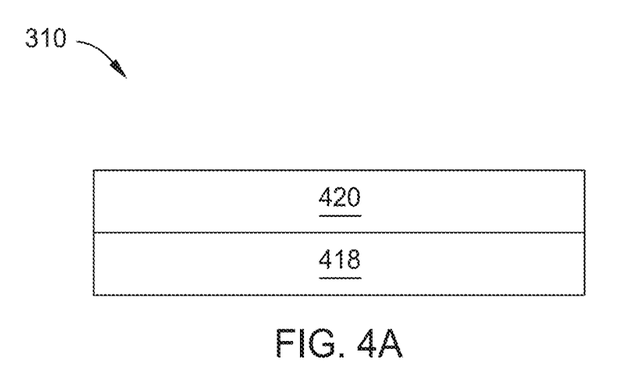
FIG. 4A illustrates the media overcoat (MOC) of FIG. 3, according to one embodiment.
Figure 4B:
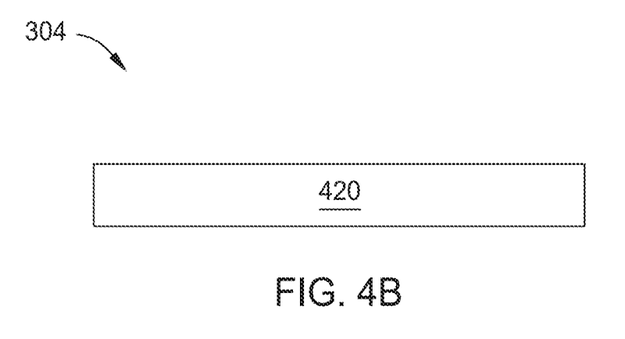
FIG. 4B illustrates the head overcoat (HOC) of FIG. 3, according to one embodiment.

FIG. 4A illustrates the MOC 310 of FIG. 3, according to one embodiment. FIG. 4B illustrates the HOC 304 of FIG. 3, according to one embodiment. The MOC 310 comprises a bilayer, the bilayer comprising a first layer 418 of carbon having a high k-value of about 0.5 or greater and a second layer 420 of SiN having a low k-value of less than about 0.1, such as about 0.0. The SiN layer 420 is disposed on the carbon layer 418 such that the smear 306 will be disposed on the SiN layer 420. The carbon layer 418 has a thickness of about 2 nm to about 4 nm, and the SiN layer 420 of the MOC 310 has a thickness of about 0.4 nm to about 1 nm. The HOC 304 comprises SiN 420 having a low k-value of less than about 0.1, such as about 0.0. The SiN layer 420 of the HOC 304 has a thickness of about 1 nm to about 4 nm. Such optimal k-values result in any smear 306 having a k-value of less than about 0.1, such as 0.0, preventing optical power loss.

Because the SiN layer 420 of the MOC 310 is disposed on top of the carbon layer 418, a smear 306 will be disposed between the SiN layer 420 of the MOC 310 and the SiN layer of the HOC 304. As such, the smear 306 will comprise SiN having a low k-value of less than about 0.1, such as about 0.0 as well, resulting in the smear 306 being transparent. In other words, the smear 306 is comprised of a portion of the SiN layer 420 of the HOC 304 and a portion of the SiN layer 420 if the MOC 310.

Figure 5:
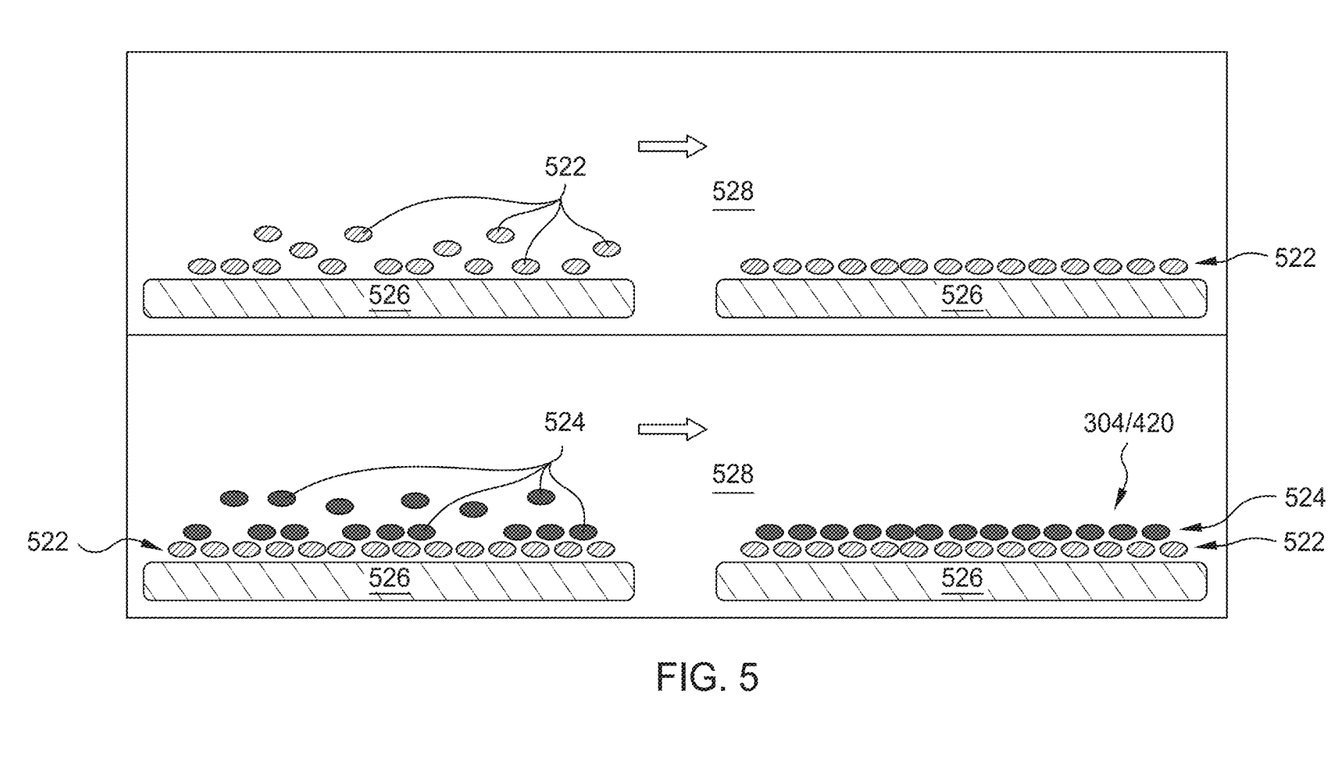
FIG. 5 illustrates a deposition process for forming the SiN layer having a low k-value of about 0.0 for the HOC and the MOC, according to one embodiment.

FIG. 5 illustrates a deposition process for forming the SiN layer 420 having a low k-value of about 0.0 for the HOC 304 and the MOC 310, according to one embodiment. The HOC 304 is formed in a chamber 528, such as an atomic layer deposition (ALD) chamber or a plasma enhanced (PE) ALD chamber. The chamber 528 is first cleaned to eliminate any debris. Forming the SiN layer 420 comprises two half-cycle reactions within the chamber 528. In the first half-cycle reaction, a substrate 526 within the chamber 528 is exposed to silicon 522, and chemisorption interactions allow precursor molecules of silicon 522 to "stick" to the surface of the substrate 526. The chamber 528 is then purged.

During the second half-cycle reaction, the substrate 526 having the silicon 522 disposed thereon is exposed to nitrogen 524, which serves the purpose of eliminating the undesired surface components and forming the silicon-nitrogen bonds. The silicon 522 surface provides reactive sites for the nitrogen adsorption to form the silicon-nitrogen bonds, where nitrogen 524 is on the top surface of the SiN layer 420 to improve adhesion to the lubricant 308. The chamber 528 is then purged again. The resulting SiN 420 is dense, has a low k-value of less than about 0.1, such as about 0.0, has atomic-scale thickness precession, and a low thermal budget.

Figure 6:
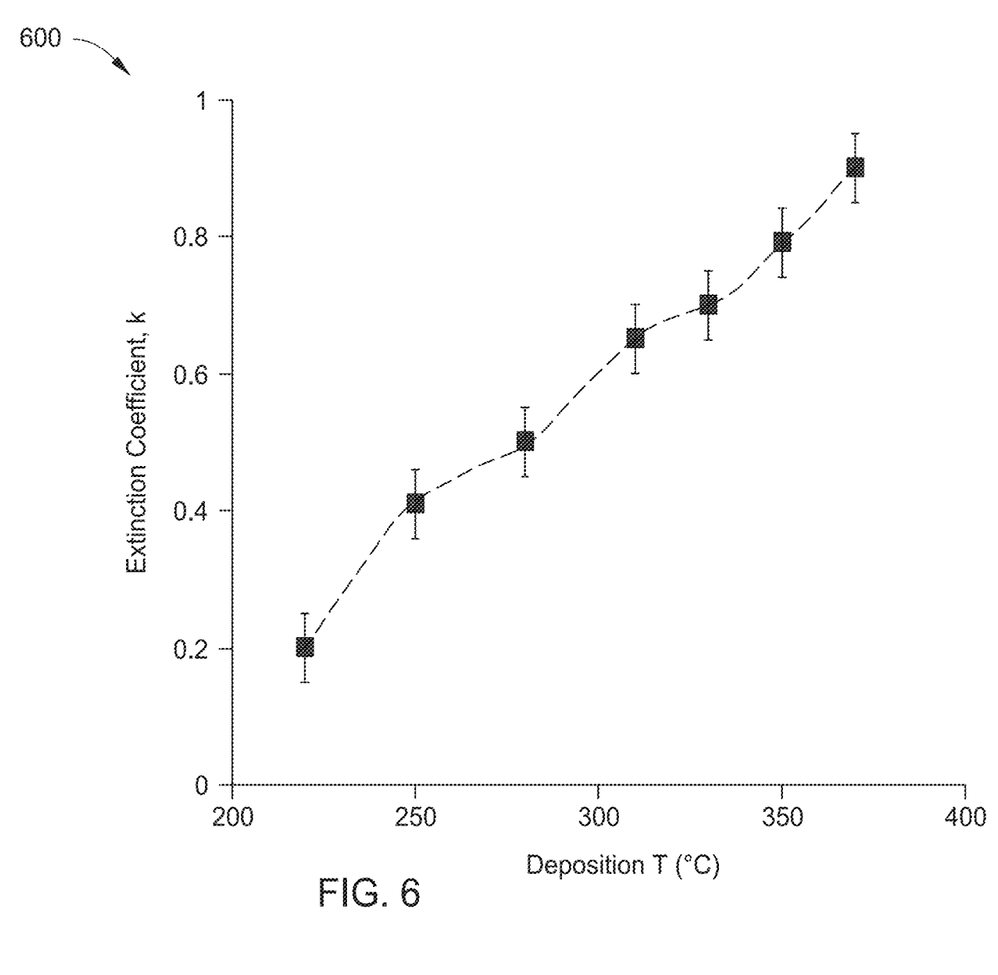
FIG. 6 illustrates a graph 600 showing the k-value of the carbon layer versus deposition temperature (° C.) when forming the carbon layer, according to one embodiment.

The carbon layer 418 is formed in a chemical vapor deposition (CVD) process, such as a PECVD process. FIG. 6 illustrates a graph 600 showing the k-value of the carbon layer 418 versus deposition temperature (C) when forming the carbon layer 418, according to one embodiment. As shown in the graph 600, when the deposition temperature is greater than about 275° C., a k-value of about 0.5 or greater is achieved. Thus, by adjusting the deposition conditions when forming the carbon layer 418 and/or doping the carbon layer 418 with a metal, the optical properties of the carbon layer 418 can be tuned to increase optical energy absorption and boost the recording performance of the write head 300.

Therefore, utilizing a MOC comprising a bilayer of carbon having a high k-value and SiN having a low k-value and a HOC comprising SiN having a low k-value within a magnetic recording device results in the HOC being transparent and the MOC being heat absorbing and eliminates negative impacts from the smear. Furthermore, the smear formed from the MOC and HOC during operation is transparent. The transparent HOC and the absorbing MOC increases the absorption in the media and reduces the laser power in the magnetic recording head, which reduces the temperature difference between the head and media surfaces and improves the reliability of the NFT.

In one embodiment, a magnetic recording drive comprises a write head, the write head comprising a head overcoat disposed on a media facing surface (MFS), the head overcoat comprising SiN, and a media disposed adjacent to the MFS of the write head, the media comprising a media overcoat comprising a first layer of SiN disposed over a second layer of C.

The head overcoat has an extinction coefficients (k) value of about 0.0. The media overcoat has a k-value of about 0.5 or greater. The head overcoat is transparent, and wherein the media overcoat is heat absorbent. The head overcoat has an extinction coefficient (k) value of less than or equal to about 0.1. The head overcoat is formed by atomic layer deposition (ALD).

In another embodiment, a magnetic recording drive comprises a write head, the write head comprising: a main pole, a waveguide disposed adjacent to the main pole, a near field transducer (NFT) coupled between the main pole and the waveguide at a media facing surface (MFS), and a head overcoat disposed on the MFS, the head overcoat comprising SiN, and a head overcoat disposed on the MFS adjacent to the NFT, the head overcoat comprising SiN and having an extinction coefficients (k) value of about 0.0, and a media disposed adjacent to the MFS of the write head, the media comprising a media overcoat comprising a bilayer of SiN and C, with the C layer having a k-value of 0.5 or greater.

The head overcoat is formed by atomic layer deposition (ALD). The SiN layer of the media overcoat is deposited using ALD, and wherein the C layer of the media overcoat is deposited using chemical vapor deposition. The SiN layer of the media overcoat is disposed over the C layer of the media overcoat. The head overcoat has an extinction coefficient (k) value of less than or equal to about 0.1. The head overcoat is transparent. The media overcoat is light absorbing.

In yet another embodiment, a magnetic recording drive comprises a write head, the write head comprising: a main pole, a waveguide disposed adjacent to the main pole, a near field transducer (NFT) coupled between the main pole and the waveguide at a media facing surface (MFS), and a transparent head overcoat disposed on the MFS adjacent to the NFT, the head overcoat comprising SiN and having an extinction coefficients (k) value of less than about 0.1, and a media disposed adjacent to the MFS of the write head, the media comprising an absorbent media overcoat comprising a first layer of C and a second layer SiN, the first layer of C having a k-value of 0.5 or greater.

The second layer of SiN is disposed on the first layer of C. The head overcoat and the second layer of SiN of the media overcoat are deposited by atomic layer deposition (ALD), and wherein the first layer of C of the media overcoat is deposited using chemical vapor deposition. The head overcoat has an extinction coefficients (k) value of about 0.0. The head overcoat is transparent, and wherein the media overcoat is heat absorbing.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording drive, comprising:
   a write head, the write head comprising a head overcoat disposed on a media facing surface (MFS), the head overcoat comprising SiN; and
   a media disposed adjacent to the MFS of the write head, the media comprising a media overcoat comprising a first layer of SiN disposed over a second layer of C, wherein the media overcoat has an extinction coefficient (k) value of about 0.5 or greater.

2. The magnetic recording drive of claim 1, wherein the head overcoat has k-value of about 0.0.

3. The magnetic recording drive of claim 1, wherein the head overcoat is transparent.

4. The magnetic recording drive of claim 1, wherein the media overcoat is heat absorbent.

5. A magnetic recording drive, comprising:
   a write head, the write head comprising a head overcoat disposed on a media facing surface (MFS), the head overcoat comprising SiN; and
   a media disposed adjacent to the MFS of the write head, the media comprising a media overcoat comprising a first layer of SiN disposed over a second layer of C, wherein the head overcoat has an extinction coefficient (k) value of less than or equal to about 0.1.

6. The magnetic recording drive of claim 1, wherein the head overcoat is formed by atomic layer deposition (ALD).

7. A magnetic recording drive, comprising:
a write head, the write head comprising:
a main pole;
a waveguide disposed adjacent to the main pole;
a near field transducer (NFT) coupled between the main pole and the waveguide at a media facing surface (MFS); and
a head overcoat disposed on the MFS adjacent to the NFT, the head overcoat comprising SiN and having an extinction coefficient (k) value of about 0.0; and
a media disposed adjacent to the MFS of the write head, the media comprising a media overcoat comprising a bilayer of SiN and C, with the C layer having a k-value of 0.5 or greater.

8. The magnetic recording drive of claim 7, wherein the head overcoat is formed by atomic layer deposition (ALD).

9. The magnetic recording drive of claim 7, wherein the SiN layer of the media overcoat is deposited using ALD, and wherein the C layer of the media overcoat is deposited using chemical vapor deposition.

10. The magnetic recording drive of claim 7, wherein the SiN layer of the media overcoat is disposed over the C layer of the media overcoat.

11. The magnetic recording drive of claim 7, further wherein the head overcoat has an extinction coefficient (k) value of less than or equal to about 0.1.

12. The magnetic recording drive of claim 7, wherein the head overcoat is transparent.

13. The magnetic recording drive of claim 7, wherein the media overcoat is heat absorbing.

14. A magnetic recording drive, comprising:
a write head, the write head comprising:
a main pole;
a waveguide disposed adjacent to the main pole;
a near field transducer (NFT) coupled between the main pole and the waveguide at a media facing surface (MFS); and
a transparent head overcoat disposed on the MFS adjacent to the NFT, the head overcoat comprising SiN and having an extinction coefficient (k) value of less than about 0.1; and
a media disposed adjacent to the MFS of the write head, the media comprising a heat absorbent media overcoat comprising a first layer of C and a second layer SiN, the first layer of C having a k-value of 0.5 or greater.

15. The magnetic recording drive of claim 14, wherein the head overcoat has an extinction coefficient (k) value of about 0.0.

16. The magnetic recording drive of claim 14, wherein the second layer of SiN is disposed on the first layer of C.

17. The magnetic recording drive of claim 14, wherein the head overcoat and the second layer of SiN of the media overcoat are deposited by atomic layer deposition (ALD).

18. The magnetic recording drive of claim 14, wherein the first layer of C of the media overcoat is deposited using chemical vapor deposition.

19. The magnetic recording drive of claim 14, wherein the head overcoat is transparent, and wherein the media overcoat is heat absorbing.

* * * * *